(12) United States Patent
Mauk

(10) Patent No.: US 7,127,084 B1
(45) Date of Patent: Oct. 24, 2006

(54) METHOD OF CREATING DIGITAL COMPOSITE FILES OF SUPERIMPOSED IMAGES

(76) Inventor: Jamey R. Mauk, 413 Selma St., Eau Claire, WI (US) 54703

( * ) Notice: Subject to any disclaimer, the term of this patent is extended or adjusted under 35 U.S.C. 154(b) by 761 days.

(21) Appl. No.: 10/394,096

(22) Filed: Mar. 20, 2003

Related U.S. Application Data

(60) Provisional application No. 60/366,947, filed on Mar. 22, 2002.

(51) Int. Cl.
*G06K 9/00* (2006.01)

(52) U.S. Cl. .................... 382/112; 382/312; 382/100

(58) Field of Classification Search ............ 382/112, 382/312, 100; 347/5 A, 60, 65, 42; 386/121, 386/125, 126; 358/1.18, 1.6; 348/143
See application file for complete search history.

(56) References Cited

U.S. PATENT DOCUMENTS 6,034,785 A * 3/2000 Itoh ..................... 358/1.18
6,556,775 B1 * 4/2003 Shimada .................. 386/121
6,634,735 B1 * 10/2003 Silverbrook ............... 347/54
6,827,428 B1 * 12/2004 Silverbrook ............... 347/60

* cited by examiner

*Primary Examiner*—Anh Hong Do
(74) *Attorney, Agent, or Firm*—Anthony J. Bourget

(57) ABSTRACT

A method for creating digital composite files of superimposed images of an object and a setting where the object and setting are at differing locations, the method comprising the steps of first placing of a dummy within the setting; first shooting of film for capturing a setting-dummy image; removing the dummy from the setting; second shooting of film for capturing a setting image; creating a simulated setting; second placing of an object within the simulated setting; third shooting of film for capturing the object image; digitally scanning the setting image to create a digital setting image; digitally scanning the object image to create a digital object image; referencing the setting-dummy image; and manipulating the digital images to create a digital composite image; whereby the digital composite image includes a realistic composite image of the object and setting and may be output to a print media for viewing.

17 Claims, 6 Drawing Sheets

METHOD OF CREATING DIGITAL COMPOSITE FILES OF SUPERIMPOSED IMAGES

CROSS-REFERENCE TO RELATED APPLICATIONS, IF ANY

Applicant claims priority based on Provisional Patent Application No. 60/366,947, filed Mar. 22, 2002.

BACKGROUND OF THE INVENTION

This invention relates to a process of creating digital composite files of superimposed images, and more particularly to a method of creating digital files (and corresponding print photographs) having superimposing objects or models upon a background setting so that photos of objects and models may be taken at a location apart from the setting in which they are to be realistically recast.

DESCRIPTION—BACKGROUND OF PRIOR ART

Creation of photographic images by superimposing inanimate objects or human models into backgrounds or scenes is not new. The ability to create photographic images has increased dramatically with the aid of desktop publishing software and technology. Photographs are manipulated and composited as standard procedure by many photographers, graphic artists and other technicians with commonly used software, for example, with Adobe Photoshop®.

Typically, objects or models are photographed on a white background for ease of outlining and then they are "cut-out" and placed into a different background. This process results in photographic prints or images having a wide range of quality levels, from amateur to professional. The "cut-out" is accomplished by use of digital imaging software. Such software is readily available in many varieties, and costs from just a few dollars to several hundred dollars. The typical "cut-out" procedure consists of manipulating the digital image files and picking and choosing the particular objects or images that have been captured. Typical procedures, however, have many limitations, especially when viewed by higher-end professionals and clientele.

These and other procedures have resulted in difficulty for users to accurately and/or realistically secure an object to or within its destination setting, or more specifically, securing an object to its point of contact. The object/model may include an inanimate object such as manufactured products, including shoes, or a human model such as a fashion model. Applicant refers to the point of contact as the "foot-plant" for animate objects such as humans or animals, and the "object-anchor" for inanimate objects. Past processes make it extremely difficult or nearly impossible to create a superimposed image that has an accurate or realistic "foot-plant" and/or object anchor.

While in some cases inanimate objects may be efficiently anchored to their contact using past processes, applicant has found that manipulated images involving humans results in greater scrutiny. When a composite includes a human form, a typical person's perception of what is acceptable changes. While it is possible to superimpose an object/model into an existing scene with current techniques, it is extremely difficult, if not impossible, to achieve a realistic effect if the composite involves a human with a "foot-plant".

Efforts have been made to deal with the unrealistic "foot-plant" images in a variety of means, including cropping the subject or avoiding the foot-plant situation by other techniques. The unrealistic images created by foot-plant and object anchor problems represent a definite weakness in current image processing. Objects or people requiring interaction or relationships with other objects within the scene must be incorporated through manipulation when utilizing a composite method. This manipulation must appear realistic. In the motion picture industry, realism in the foot-plant is masked in the motion itself. Motion pictures have the liberty of scene movement, which allow for creating an impression of acceptable realism in any event, because, after all, it is only a movie. However, the still image or print image is permanent. It can be enlarged, studied, critiqued and analyzed at the leisure of the viewer. Thus, the quality level and impression of realism must be very high, it must match the general human perceptions of what is acceptable, and must not attract suspicion to the human eye. Cutting and pasting images onto various backgrounds can easily be detected in most cases, thus souring the viewer's ideas and impressions about the image as well as casting negative impressions upon the creator of the print or sponsor/advertiser associated with the print.

Prior to the commonplace use of desktop publishing, applicant attempted to create realistic composite images using in-camera techniques together with double exposures or other tricks. Such techniques met with unacceptable results. Use of digital software tools used in conjunction with a PC computer made some improvements, however, the computer-generated art and prints were perceived by the viewer as such. Digital manipulations which tried to convey realism were usually immediately identified. Applicant also attempted several other techniques using expensive computer systems and attempts to manipulate available stock photography images. Again, use of stock photography still resulted in unrealistic images.

Applicant also attempted to use several images captured specifically for the purpose of creating a composite, rather than using stock images. The effects were much improved, however, realism was not fully accomplished. Applicant also attempted to photograph specific images to create a composite result, attempting to combine the photographed images into available stock backgrounds. Again, the results were improving, but far from what was required for realism or what was subsequently developed.

Photographing images specifically for a composite to manipulating them into stock backgrounds was satisfactory for inanimate objects, such as images involving vehicles or perhaps some types of animals. When dealing with images comprising people, however, especially when the foot touched a surface, the results were not satisfactory. In many case the "foot-plant" was a critical point to capture realistically and would often signal to the viewer that the print was computer generated, or that attempts were made for computer enhancement. In the case of inanimate objects, the anchor-images were easier to resolve generally because a viewer sometimes does not really have anything to understand for comparison purposes. In such cases, the prospects of recognizing defects in the composite are decreased. However, viewers generally understand people and human images, and how they interact with the surrounding and the objects around them. Any defect in the realistic aspect of the image is far more detectable to the human eye when involving other people. A "pretty good" composite with an object is often satisfactory. Any defect, including scale or distortion, or "foot-plant," involving a human is easily noticed by the viewer. Applicant has found that viewers are much more accepting of object distortion and accept the surreal aspects or slight discrepancies or minor defects, however, anything associated with an odd human form, especially realism in the foot-plant, is highly criticized.

Further attempts were made to photograph models within a studio using simulated lighting within the scene which was similar to scene shown in a stock image. The images lacked dimension and did not appear real.

Due to the forgoing limitations, attempts to use such prior techniques in print advertising are rare. The advertising industry, therefore, avoids "foot-plants" in the higher-end composite images. Given the drawbacks of creating realistic print images, advertisers are reluctant and generally opposed to using composite prints, especially when human and foot-plant situations were involved. None of the previous techniques allowed for sufficient realistic images. Consequently, applicant has invented a technique for creating realistic digital composite files of superimposed images and related prints, while providing many additional features that are unique to the techniques and prints described herein.

It is thus an object of the present invention to provide a method for creating composite images that appear realistic.

It is also an object of the present invention to provide a method of creating composite images which properly show a foot-plant.

It is a further object of the present invention to provide a method for superimposing objects or models on a background.

It is another object of the present invention to provide a method for creating photographs where the model has an appropriate foot-plant.

It is another object of the present invention to provide a method for creating superimposed photographs where the introduced objects or models may be independently photographed and realistically composited.

It is another object of the present invention to provide a method for creating superimposed photographs where the introduced objects or models may be independently photographed and which exhibit accurate and realistic shading and dimensions when placed in a background setting.

It is another object of the present invention to provide a method for creating realistic photographs of a model within a setting where the model is not actually located in the setting.

It is another object of the present invention to provide a method for creating realistic photographs of a model within a setting while foregoing the cost of employing a model to be located at the setting.

Other features, benefits and objects of the invention will become apparent to those skilled in the art by reference to the following summary, description, claims and drawings.

BRIEF SUMMARY OF INVENTION

In one aspect the invention includes a method for creating a photographic print depicting a composite of an object and a setting where the object and setting are at differing locations, the method comprising the steps of first placing of a dummy within the setting; first shooting of film for capturing a setting-dummy image; removing the dummy from the setting; second shooting of film for capturing a setting image; creating a simulated setting; second placing of an object within the simulated setting; third shooting of film for capturing an object image; digitally scanning the setting image to create a digital setting image; digitally scanning the object image to create a digital object image; referencing the setting-dummy image; manipulating the digital setting image and the digital object image to create a digital composite image; and printing the digital composite image to create the photographic print.

In a further aspect the invention includes a method for creating a photographic print having an object image superimposed with a setting image, the method comprising the steps of planning the layout of the setting; first documenting of the setting; first placing of a dummy within the setting; first shooting of film for capturing a setting-dummy image; removing the dummy from the setting; second shooting of film for capturing a setting image; second documenting of the setting and technical environment; creating a simulated setting and a simulated technical environment; second placing of an object within the simulated setting; third shooting of film for capturing an object image; digitally scanning the setting image and the object image to create a digital setting image and a digital object image; referencing the setting-dummy image; manipulating the digital setting image and the digital object image to create a digital composite image; and printing the digital composite image to create a photographic print.

In yet another aspect the invention includes a method for creating a digital composite file of superimposed images of an object and a setting where the object and setting are at differing locations, the method comprising the steps of first placing of a dummy within the setting; first shooting of film for capturing a setting-dummy image; removing the dummy from the setting; second shooting of film for capturing a setting image; creating a simulated setting; second placing of an object within the simulated setting; third shooting of film for capturing an object image; digitally scanning the setting image to create a digital setting image; digitally scanning the object image to create a digital object image; referencing the setting-dummy image; and manipulating the digital setting image and the digital object image to create the digital composite image; whereby the digital composite image includes a realistic composite image of the object and setting and may be output to a print media for viewing.

In yet another aspect the invention includes a method for creating a digital composite file of superimposed images of an object and a setting where the object and setting are at differing locations, the method comprising the steps of first placing of a dummy within the setting; first capturing of a setting-dummy image; removing the dummy from the setting; second capturing of a setting image for creating a digital setting image; creating a simulated setting; second placing of an object within the simulated setting; third capturing of an object image for creating a digital object image; referencing the setting-dummy image; and manipulating the digital setting image and the digital object image to create a digital composite image

BRIEF DESCIPTION OF THE DRAWINGS

DETAILED DESCRIPTION OF THE PREFERRED EMBODIMENTS

The present invention is directed to a method for creating photographic images and prints depicting a composite of an object in a setting where the object and setting are at differing locations.

Figure 1:
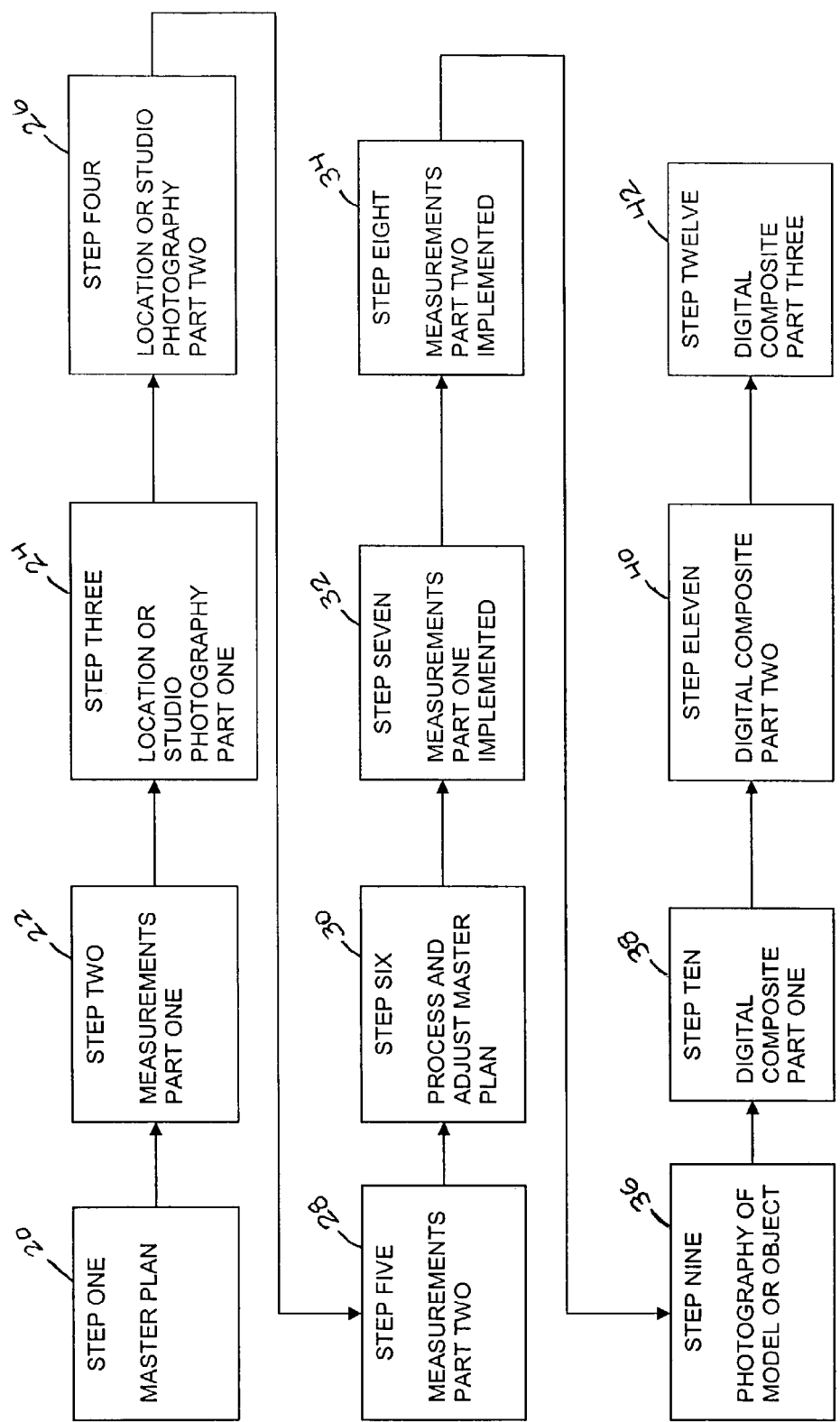
FIG. 1 is a flowchart of a process according to the present invention.

FIG. 1 is a flowchart depicting the main steps used in the print creation method according to the present invention. Starting at block 20 which includes Step One, a master plan is prepared. In preparing the master plan, preferably all details are exhaustively examined and planned, including studio and/or location background scenes, dummy scenes, props, camera angles, light effects, object/model measurements, object/model dummy measurements, interaction, foot-plants or object-anchors and all relationships. The plan is made with care and great detail with each step of the subsequent process considered so that problems may be solved in advance. The focus is on the goal of capturing and preserving the most realistic image effects as possible. In doing so, the preparer or user must keep in mind that the angles and intensities of lighting are crucial so that appropriate recreation of shadows and realistic images are obtainable. Preferably, the person (or persons) who digitally manipulates the images in subsequent steps (described below) is the person involved in Step One.

The method proceeds to block 22 which includes Step Two, Measurements Part One, where measurements are taken. Every detail of the existing or proposed scene is measured and/or documented, including lighting issues (which would include considerations involving obstacles such as walls, trees, etc in a 360 degree pattern around the site which would affect workability of the set and/or lighting concerns), available light, available props, equipment restrictions, power supplies, scheduled conflicts, scene dimensions and foot-plant/object anchor possibilities (such as steps, chairs, windows, doors, porches, posts). Potential poses and other contributing factors are determined in this Step Two. All locations must be thoroughly investigated or scouted in advance. In some cases, Step Two involves specially designing a studio set to act as the background or alternate location. Corresponding measurements of the physical layout, lighting issues and other issues described in this Step Two are measured and preferably documented.

Next, at Block 24, the method includes Step Three, Location or Studio Photography, Part One. Here the studio or location background scenes are photographed according to the master plan, comprising a three-dimensional object/model dummy as a stand-in. Several photographs are taken of the dummy as it is rotated/posed in its foot-plant/object-anchor position for lighting, size, dimension and shadow reference. Preferably all interaction of the dummy with objects, props or the scene, including hand-plants or any other contact is fully documented and photographed for reference. Preferably the person (or persons) who digitally manipulates the images in subsequent steps (described below) is the same person involved in Step Three. In this fashion, the person involved in the manipulating step has an educated view of the preferred shadowing and image, and is thus able to employ more photographic/computer background knowledge to develop a realistic composite image. A skilled professional photographer is generally equipped with the knowledge of understanding lighting and positioning to better appreciate the factors that might influence a realistic composite.

Figure 3:
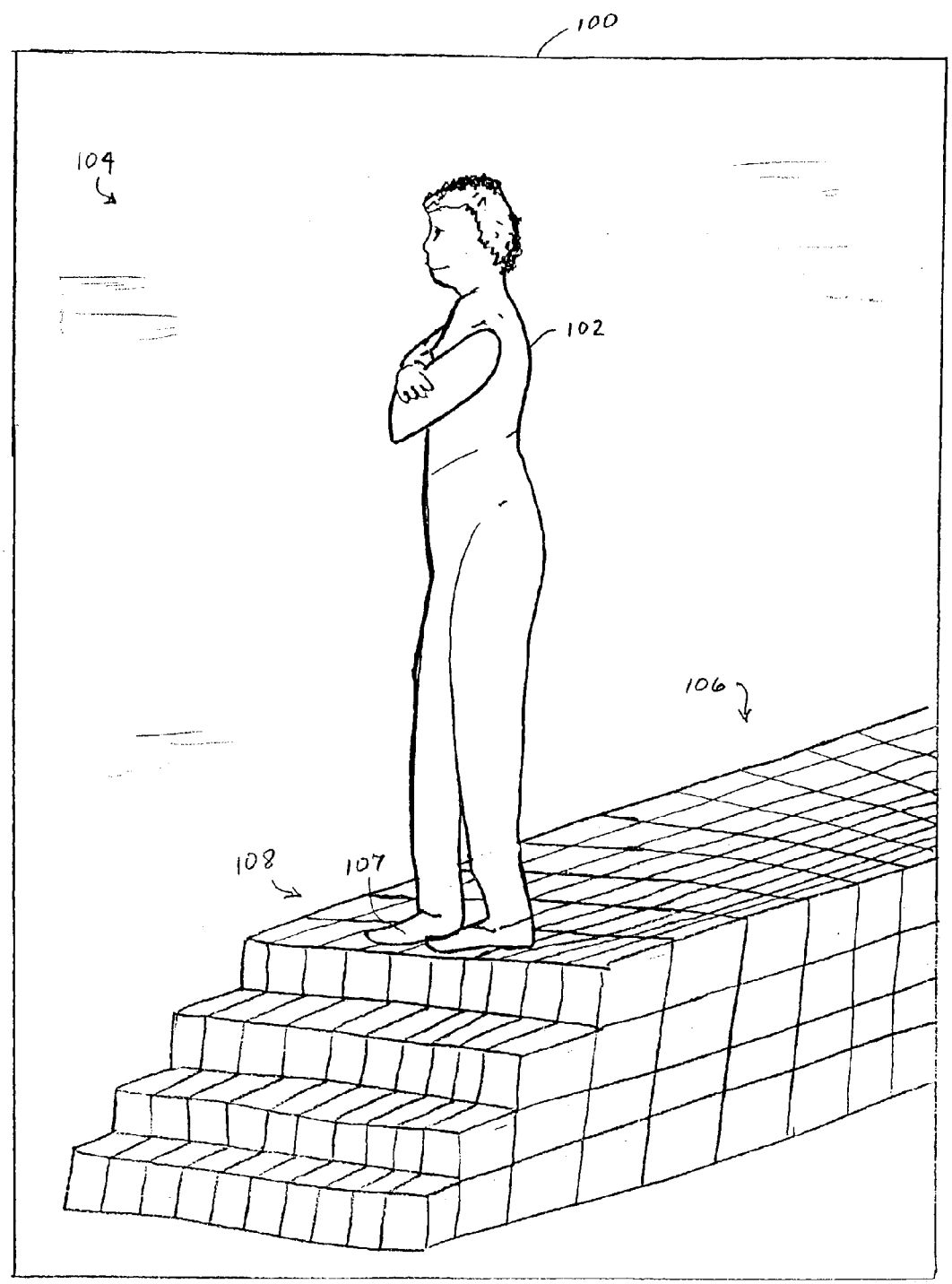
FIG. 3 is a view of a setting-dummy image in accordance with the present invention.

The method step at Block 24 can be further described with reference to the Figures, including FIG. 3. FIG. 3 shows a view of a setting-dummy image 100. The setting-dummy image 100 can be a photographic image or an image captured digitally and displayed on a computer screen, for instance. A three-dimensional object/model dummy 102 is used as a stand-in. A stand-in person is used as a dummy 102 in this instance. A stand-in could also include an object. Preferably, dummy 102 has physical characteristics similar to those of a model 114 to be used in the final image/print (see FIG. 5 for model 114). Dummy 102 makes a pose similar to that intended to be made by model 114. The location scene 104 includes brick steps 106. It may be appreciated that the location scene 104 would also include background objects which occur in any natural, or manufactured setting, including trees, plants, buildings, walls, hallways, pillars, cars, scenery, wildlife, or other natural items, including any studio location setting if desired. It may be appreciated that the location scene 104 may encompass a wide variety of potential scenes, indoors and outdoors, natural and man-made, anyplace and anywhere. In this instance, dummy 102 is wearing shoes 107 and is standing on brick steps 106. Various poses may be photographed, including several variations on a foot-plant 108. In this case the foot-plant is positioned at the edge or the top step of the steps 106. It may be appreciated that object-anchors (not shown) can be provided, for instance, if the dummy 102 were to lean on a pillar or hold an item in hand.

The method continues at Block 26 which includes Step Four, Location or Studio Photography Part Two. This Step Four includes photographing exactly, and preferably according to plan, the studio or location background scenes as in Step Three. However, in this Step Four, the studio location 104 or background scenes are photographed without use of the three-dimensional dummy 102 or stand-in. The camera, lights and stage remain exactly in the same position. Preferably nothing is changed or moved. From these photographs a final photograph is selected, which will serve as the final background scene to be used in the final composite image.

Figure 4:
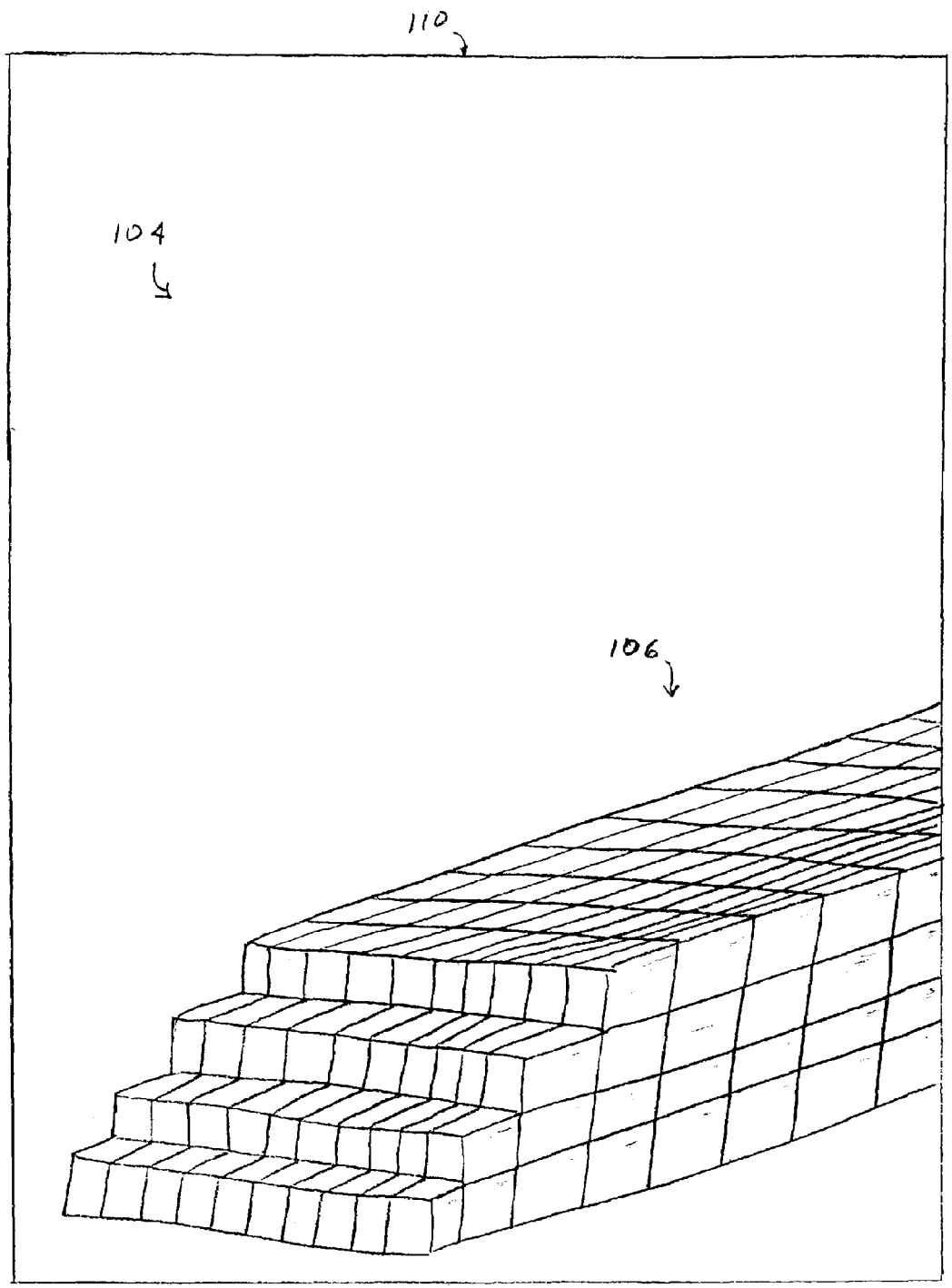
FIG. 4 is a view of a setting image in accordance with the present invention.

The method step of Block 26 can be further described with reference to the figures, including FIG. 4. FIG. 4 shows a view of setting image 110. Setting image 110 can be a photographic image or an image captured digitally and displayed on a computer screen, for instance. In this step, no object/model dummy is used as a stand-in. Several setting images 110 will be captured for later selection of the final setting image 110 to be used as desired. The setting image 110, or at least one of them, will serve as a final background scene to be used in the compositing.

The method continues at block 28 which includes Step Five, Measurements Part Two. This Step Five includes fully documenting the equipment that was used to photograph the location scene 104 including a detailed schematic of all power settings, gels, correction/compensating filters, lenses, meter readings, exposures, emulsions, available light sources, strobe sources, positions, directions, details, camera height and position, and any other technical data required for use in subsequent steps including Step Seven. Available light sources include natural and artificial light sources at this scene, including table lamps, fluorescents, street lights, candles, fires, sunlight, etc.

At Block 30, the method includes Step Six, Process and Adjust Master Plan. The film which was exposed in previous steps, such as Step Three and Step Four is now processed or developed and then analyzed. Any additions or alterations to Step One Master Plan required as a result of the analysis are preferably implemented in this Step Six. The original composite concept is finalized along with a detailed plan of the studio photography including model poses or object placements relative to foot-plant, hand-plant or object-anchor, as well as other relationships and interactions or contact points.

The method continues at Block 32, which includes Measurement Implementation Part One. The measurements obtained in Step Two or Block 22, are used to accurately simulate a 3-dimensional replica of the background location scene 104 which was photographed in Step Four, Box 26. The replication occurs utilizing interactive props and foot-plants, hand-plants or object anchors (such as steps, chairs, windows, doors, porches or posts) which may be borrowed, rented, re-constructed or purchased according to Steps One and Six, or otherwise as needed. The replica model scene 112 is typically created in the studio for complete environmental control. The model scene provides a replica reference of the original location scene 104 for the model 114 interaction.

The method continues at Block 34 which includes Step Eight, Measurements Part Two Implemented. The measurements in Step Five, Block 28, are used to accurately simulate the entire technical situation which occurred at the setting or location scene 104 during Step Three and Step Four photography. All elements are preferably positioned according to the schematic. All available light sources preferably as measured in Step Five, Block 28, are also simulated to the best ability.

The method continues at Block 36, which includes Step Nine, Photography of Model or Object. In this Step Nine, the model 14 or object is physically inserted into the replicated scene 112 and photographed in a variety of poses/positions as pre-planned preferably as in previous steps. In a preferred embodiment, the photographer references the Step Three, Block 24, setting-dummy image 100 in order to adjust the model scene 112 to simulate lighting variables, including shadows, highlights as the model 114 or object moves throughout the model scene 112. Referencing setting-dummy image 100 assists the photographer in creating accuracy while adjusting the studio lighting to obtain the best quality of light possible. Thus, the original lighting situation is accurately simulated, and it also has the potential to be improved to meet or exceed client expectations.

Preferably, the same person or photographer would be involved with all Steps. It is especially important that the photographer who is involved with the shooting of images in Step Nine is also the person involved with or shooting images in Step Three and Step Four. It is also important for the same person shooting images in Step Three, Step Four and Step Nine, to be involved with the digital manipulations discussed in Step Eleven, below.

Figure 5:
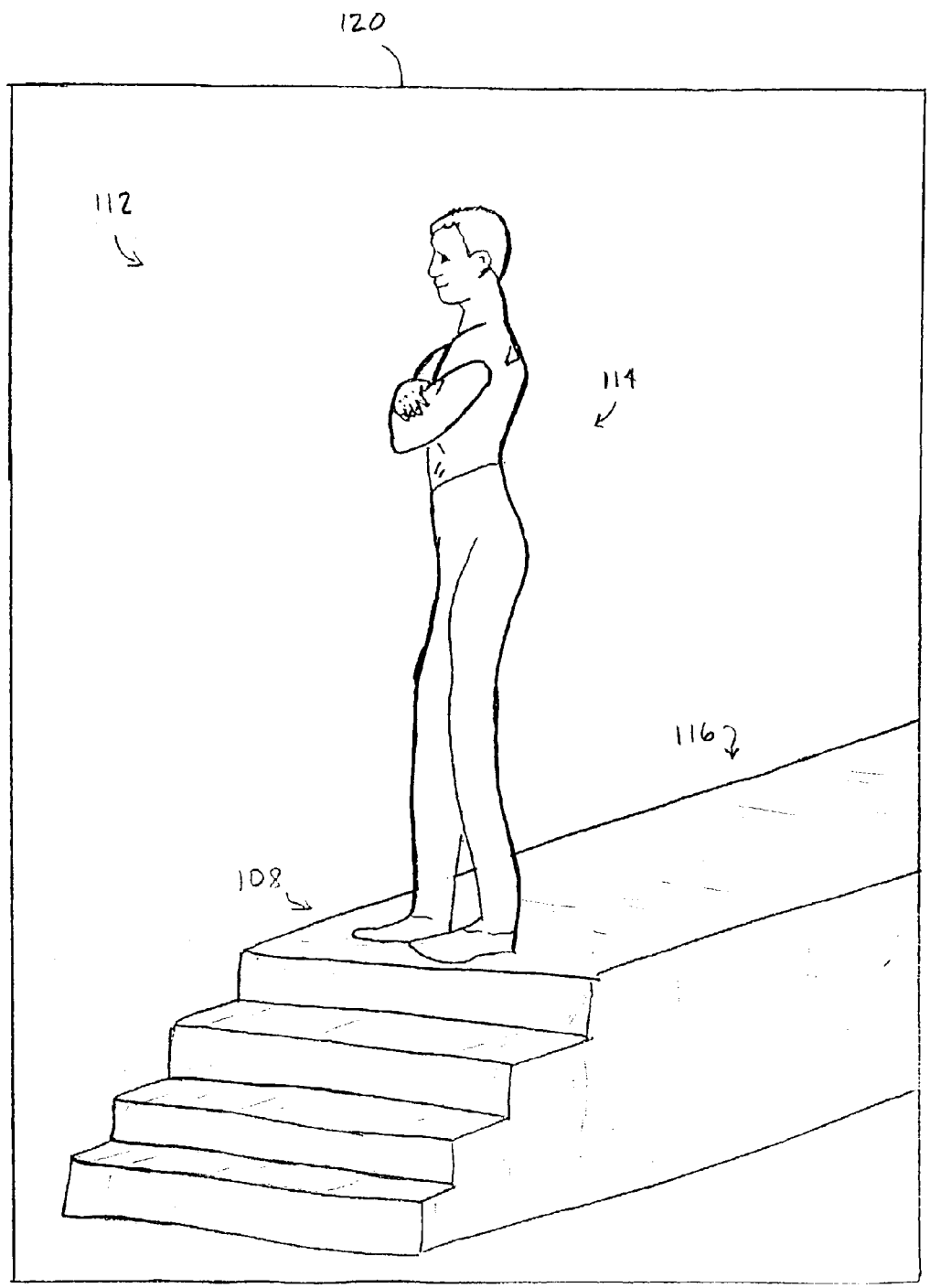
FIG. 5 is a view of a model or object image in accordance with the present invention.

The method of Block 36 can be further described with reference to the figures, including FIG. 5. FIG. 5 shows a view of model image or object image 120. Model image 120 can be a photographic image or an image captured digitally and displayed on a computer screen, for instance. In this step, the actual model 114 or object which is desired to be captured in the final image is utilized. By doing so, the model 114 does not have to be at the location scene 104 which might otherwise require great expense including travel, accommodations and set-up down-time which can become expensive given high priced modeling. Importantly, model 114 will position his feet such that the foot-plant 108 (as shown in FIG. 5) is replicated as near as possible as foot-plant 108 shown in FIG. 3. It can be appreciated that a hand-plant or object-plant can be similarly replicated, as desired. In FIG. 5, simulated object 116 includes a simulated step made out of wood, for instance, as opposed to the real brick steps of the location scene 104.

The method continues at Block 38 and includes Step Ten, Digital Composite Part One. In this step, the film exposed (or digital capture of the image) in Step Nine, Block 36 is processed and analyzed. The final images, background scene and object/model for compositing are selected, digitally scanned and/or converted to CMYK and color balanced. Alternatively, the images are already in digital form and are thereafter properly configured with color balance or other photographing techniques. Next, utilizing common computer design techniques, the object/model 114 is outlined and layered utilizing Adobe Photo Shop or other software. The layered object/model 114 is then superimposed into the background scene 104 and scaled/positioned with reference to the Step Three setting-dummy image 100. The dimension/scale and perspective of the superimposed layer must be as accurate as possible to retain a realistic effect. Use of the setting-dummy image and the setting image 110 is crucial in achieving realistic success.

Figure 6:
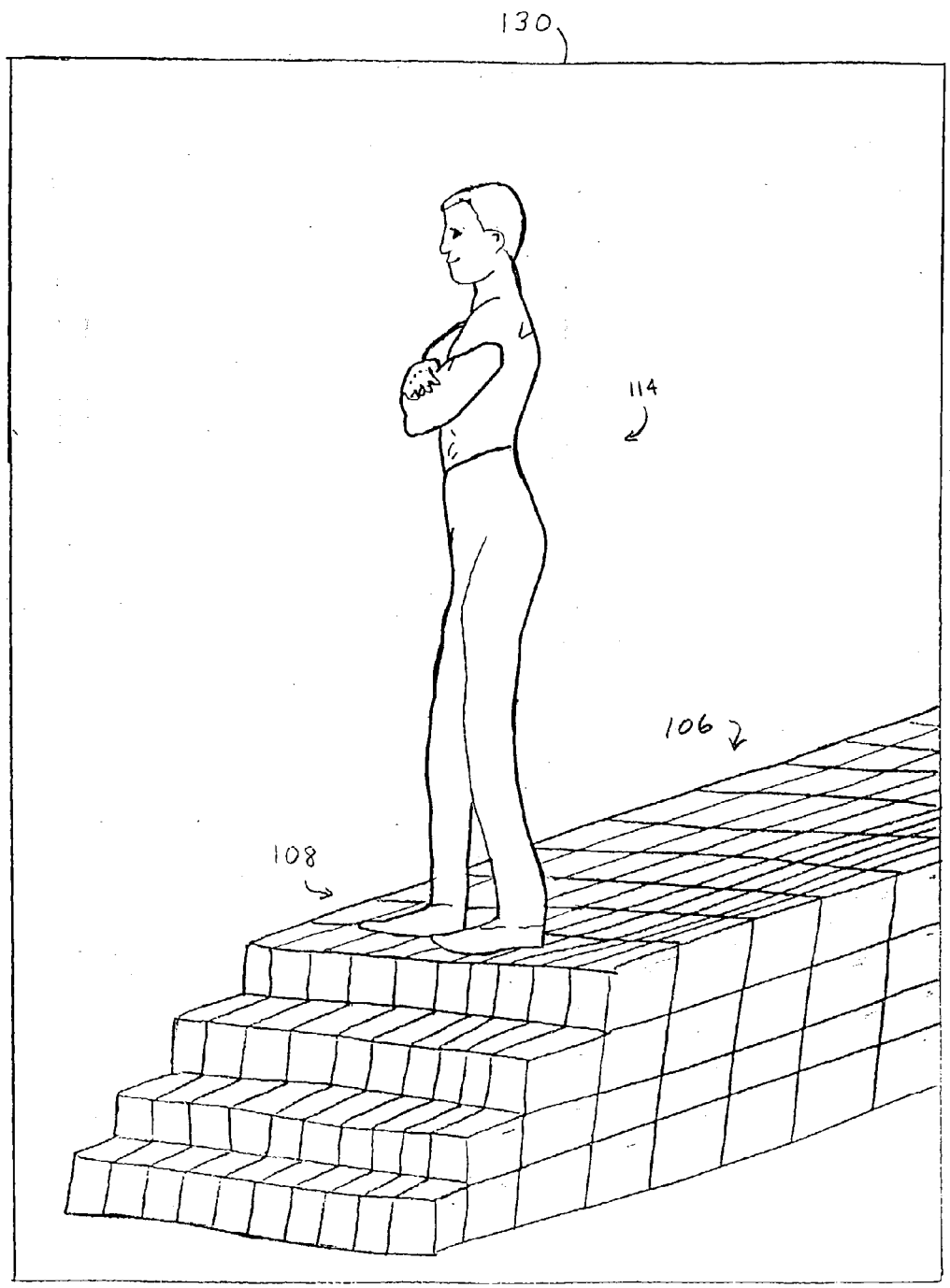
FIG. 6 is a view of a composite image in accordance with the present invention.

The method step of Block 38 can be further described with reference to the figures, including FIG. 6. FIG. 6 shows a view of composite image 130. Composite image 130 can be a photographic image or an image captured digitally and displayed on a computer screen, for instance.

The method continues at Block 40, which includes Step Eleven, Digital Compositing Part Two. The person who photographed the setting-dummy 100 and setting image 110 in Steps Three and Four is preferably the person to manipulate this stage of the superimposing process. The photographer references lighting configuration schematics, photographic formulas, 3-dimensional obstacles, object/model measurements, dummy measurement or other relevant data from the location scene 104 to visually apply complex layers of shadow with texture, depth and density (all as needed) to the scene which the superimposed model/object 114 now occupies. Hereagain, the setting-dummy 100 and setting image 110 are critical in the development in a realistic composite. Manipulation may be made to either the object image, the setting image, or both. For instance, the model may require retouching. The major manipulation occurs, however, to the setting image after the model image is placed within the setting image.

The method continues at Block 42, which includes Step Twelve, Digital Compositing, Part Three. The final composite image 130 consists of several layers which are now flattened into a final image. The image is color corrected, tested and approved. The final image is then ready for print. A digital file of the final image is delivered to the client for printing.

Preferably, all steps are included in the above method. It may be appreciated that some of the steps could be combined, such as some of the measurements made in Step Two may well overlap with measurements made in Step Five, and parts of Step Seven and Step Eight could be combined. Further, Step Four could be accomplished before Step Three. Step Ten, Step Eleven and Step Twelve could be combined. Applicant believes that all steps are important and preferably no step is skipped.

It may be appreciated that the images/objects, settings, etc. to be photographed may be captured with traditional techniques of film photography. The images may also be captured with digital photographic techniques, thereby eliminating or reducing steps in the above process, including eliminating steps of shooting and developing film photography and digitally scanning the film to produce a digital image file. It can be appreciated that the term "photographic print" as used in this application may include a print in the traditional sense (which may include a print made on photographic paper from a photographic image, or on one of many mediums including negatives or transparencies), or it may include a digital image. In many instances, especially in commercial photography, transparency film is utilized, which Is rarely made into a photographic paper print, but is rather scanned into a digital file which is then printed on paper via a press (such as a 4 color press).

Additionally, studio re-creation of sunlight or ambient light is often desired. It may appropriate to use overhead reflective items (including flat sheets having reflective properties used in conjunction with lighting) or light boxes may be utilized to simulate light conditions of the location scene or setting 104.

Figure 2:
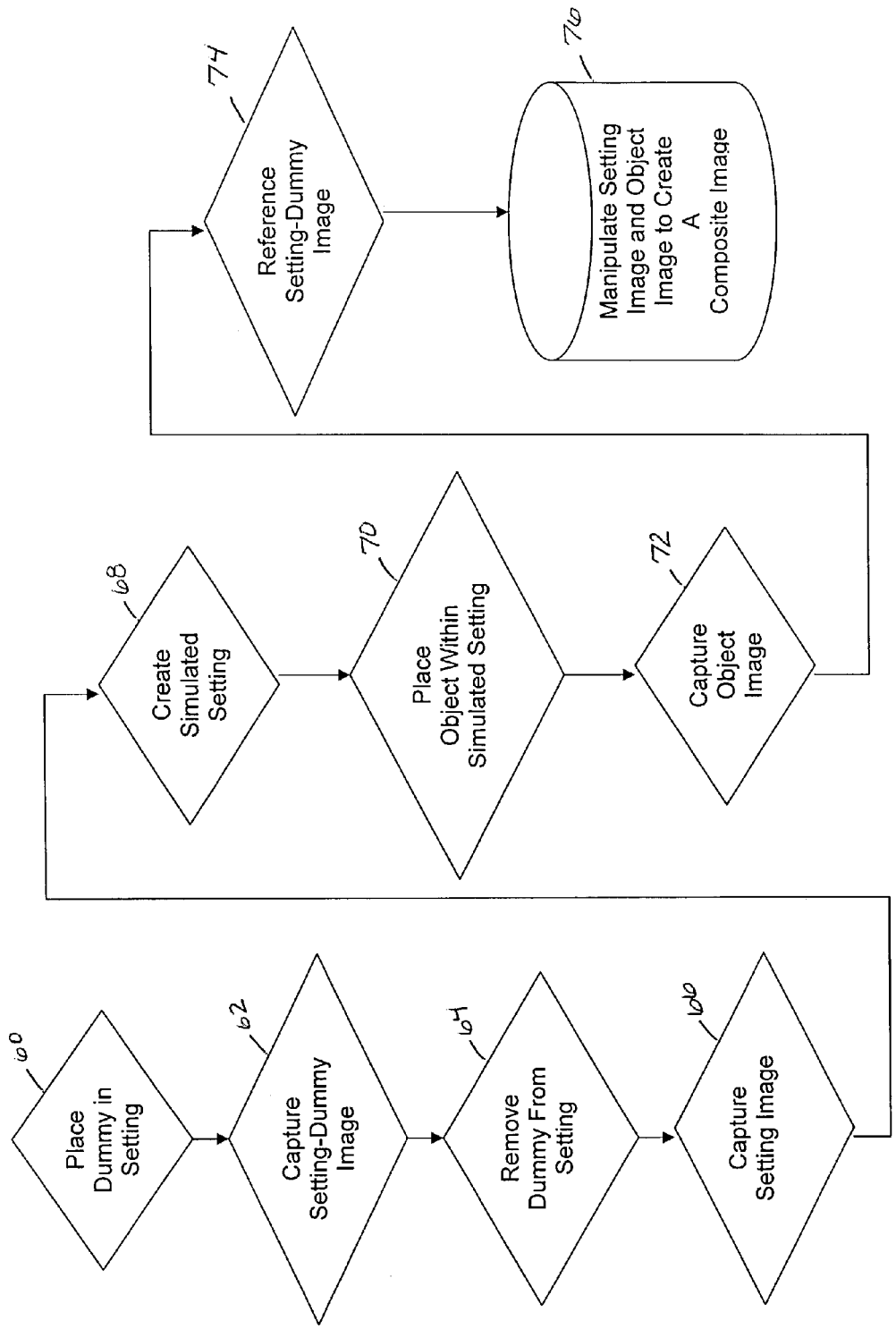
FIG. 2 is a flowchart of a further process according to the present invention.

Referring to FIG. 2, a further aspect of the present invention is presented. The method starts with Box 60 where a dummy 102 is placed in a location scene or setting 104. Next in Box 62, a setting-dummy image 110 is captured by either digital or photographic image. Next at Box 64 the dummy 102 is removed from the location scene or setting 104. In Box 66, the setting image or location scene 104 is captured. Next at Box 68 a simulated setting or model scene 112 is created. Then, at Box 70, an object or model 114 is placed within the simulated setting or model scene 112. At Box 72 a model or object image 120 is captured. Next, at Box 74, the photographer references the setting-dummy 100 and at Box 76 the photographer manipulates the setting image 110 (FIG. 4) and model or object image 120 to create the composite image 130.

It can be appreciated that the shooting of film includes the shooting of film in the traditional photographic sense or also the creation of a digital image or file.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

I claim:

1. A method for creating a photographic print depicting a composite of an object and a setting where the object and setting are at differing locations, said method comprising the steps of:
   first placing of a dummy within the setting;
   first shooting of film for capturing a setting-dummy image;
   removing the dummy from the setting;
   second shooting of film for capturing a setting image;
   creating a simulated setting;
   second placing of an object within the simulated setting;
   third shooting of film for capturing an object image;
   digitally scanning the setting image to create a digital setting image;
   digitally scanning the object image to create a digital object image;
   referencing the setting-dummy image;
   manipulating the digital setting image and the digital object image to create a digital composite image; and
   printing the digital composite image to create the photographic print.

2. A method according to claim 1 wherein said first shooting step, said second shooting step, and said manipulating step are coordinated by the same person.

3. A method according to claim 1 wherein the general appearance of the dummy is similar to the general appearance of the object.

4. A method for creating a photographic print having an object image superimposed with a setting image, said method comprising the steps of:
   planning the layout of the setting;
   first documenting of the setting;
   first placing of a dummy within the setting;
   first shooting of film for capturing a setting-dummy image;
   removing the dummy from the setting;
   second shooting of film for capturing a setting image;
   second documenting of the setting and technical environment;
   creating a simulated setting and a simulated technical environment;
   second placing of an object within the simulated setting;
   third shooting of film for capturing an object image;
   digitally scanning the setting image and the object image to create a digital setting image and a digital object image;
   referencing the setting-dummy image;
   manipulating the digital setting image and the digital object image to create a digital composite image; and
   printing the digital composite image to create a photographic print.

5. A method according to claim 4 wherein said first shooting step, said second shooting step, and said manipulating step are coordinated by the same person.

6. A method according to claim 4 wherein said first shooting of film includes placement of a dummy object within the setting, the dummy object corresponding to the model object.

7. A method according to claim 4 wherein said step of creating a simulated setting and simulated technical environment includes the step of referencing the setting-dummy image.

8. A method according to claim 4 wherein said step of second placing of an object within the simulated setting includes the step of referencing the setting-dummy image for adjusting the simulated setting and the simulated technical environment.

9. A method according to claim 4 wherein said step of creating a simulated setting includes referencing information obtained from said first documenting of the setting and said step of creating a simulated technical environment includes referencing information obtained from said second documenting step.

10. A method for creating a digital composite file of superimposed images of an object and a setting where the object and setting are at differing locations, said method comprising the steps of:
    first placing of a dummy within the setting;
    first shooting of film for capturing a setting-dummy image;
    removing the dummy from the setting;
    second shooting of film for capturing a setting image;
    creating a simulated setting;
    second placing of an object within the simulated setting;
    third shooting of film for capturing an object image;
    digitally scanning the setting image to create a digital setting image;

digitally scanning the object image to create a digital object image;

referencing the setting-dummy image; and manipulating the digital setting image and the digital object image to create the digital composite image;

whereby the digital composite image includes a realistic composite image of the object and setting and may be output to a print media for viewing.

11. A method for creating a digital composite file of superimposed images of an object and a setting where the object and setting are at differing locations, said method comprising the steps of:

first placing of a dummy within the setting;

first capturing of a setting-dummy image;

removing the dummy from the setting;

second capturing of a setting image for creating a digital setting image;

creating a simulated setting;

second placing of an object within the simulated setting;

third capturing of an object image for creating a digital object image;

referencing the setting-dummy image; and manipulating the digital setting image and the digital object image to create a digital composite image.

12. The method of claim 11 wherein said second capturing step includes use of a digital camera to capture the setting image.

13. The method of claim 11 wherein said third capturing step includes use of a digital camera to capture the object image.

14. The method of claim 11 wherein said second capturing step includes shooting of film for capturing a setting image and digitally scanning the setting image to create a digital setting image.

15. The method of claim 11 wherein said first capturing step, said second capturing step, said third capturing step, and said manipulating step are coordinated by the same person.

16. The method of claim 11 wherein said method includes the step of documenting of the setting and wherein said documenting step and said creating a simulated setting step are coordinated by the same person.

17. The method of claim 11 wherein said first capturing step, said second capturing step, and said third capturing step utilize transparency film for capturing images and digitally scanning the images to create digital images.

* * * * *